Figure 1:
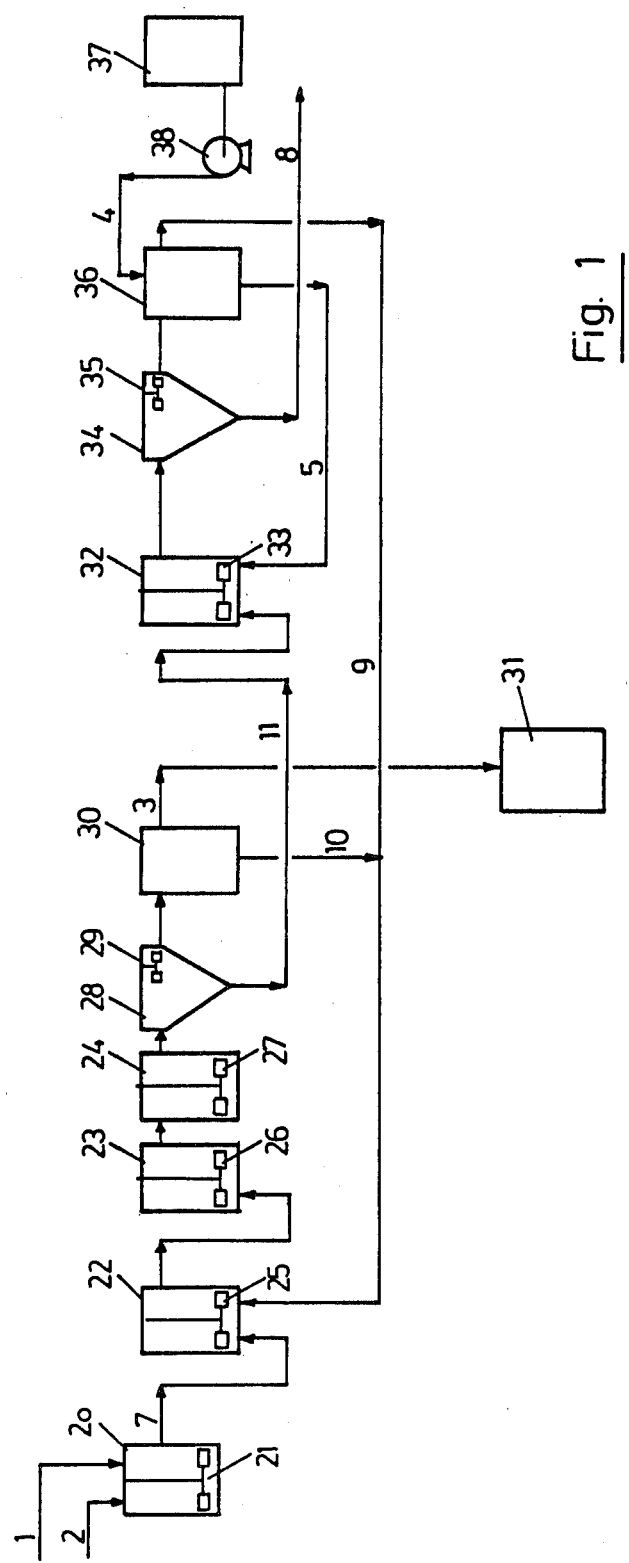

United States Patent [19]

Giskehaug et al.

[11] 4,421,649
[45] Dec. 20, 1983

[54] METHOD AND APPARATUS FOR ENRICHING COMPOUNDS OF LOW WATER SOLUBILITY FROM AQUEOUS SUSPENSIONS OF SUBSTANTIALLY INORGANIC SOLID SUBSTANCES

[75] Inventors: Karl J. Giskehaug; Kjell O. Löiten; Glör T. Mejdell, all of Porsgrunn, Norway

[73] Assignee: Norsk Hydro a.s., Oslo, Norway

[21] Appl. No.: 293,983

[22] Filed: Aug. 18, 1981

[30] Foreign Application Priority Data

Aug. 20, 1980 [NO] Norway ............................ 802471

[51] Int. Cl.³ .......................................... B01D 11/00
[52] U.S. Cl. ................................. 210/634; 210/909
[58] Field of Search .......................... 210/909, 634

[56] References Cited

U.S. PATENT DOCUMENTS 3,931,001  1/1976  Winn .......................... 210/909 X
4,219,418  8/1980  Pilon .......................... 210/909 X

OTHER PUBLICATIONS

Cremer, *Chemical Engineering Practice*, vol. 5, 11-2-4-58, pp. 478-487, 210-634.

*Primary Examiner*—Frank A. Spear, Jr.
*Attorney, Agent, or Firm*—Wenderoth, Lind & Ponack

[57] ABSTRACT

The invention relates to a method and apparatus for enriching compounds almost insoluble in water, particularly chlorinated hydrocarbons, and thereby removing them from aqueous suspensions of solid particles contaminated by such compounds. The aqueous suspension is brought in contact with an organic hydrocarbon containing solvent, and the suspension is extracted with the organic solvent in one or more mixing stages with subsequent phase separation. Each stage comprises one or more mixing sequences in series arranged upstream of a phase separation and from where a substantial part of the organic solvent is recirculated to the first mixing sequence within heat stage. The invention secures nearly complete leaching of compounds present in even less than 10% of other solid particles in an aqueous suspension.

10 Claims, 1 Drawing Figure

METHOD AND APPARATUS FOR ENRICHING COMPOUNDS OF LOW WATER SOLUBILITY FROM AQUEOUS SUSPENSIONS OF SUBSTANTIALLY INORGANIC SOLID SUBSTANCES

This invention relates to a method and apparatus for enriching compounds almost insoluble in water, particularly chlorinated hydrocarbons, and thereby removing them from aqueous suspensions of solid particles contaminated by such compounds.

Graphite is commonly used for anodes in metal production by electrolysis of melted metal chlorides, and in some processes additional carbon is introduced into the melt. The chlorine evolved at the anode will form small amounts of chlorinated hydrocarbons leaving the cells as vapor in the chlorine gas. Thus, when chlorine produced by the electro-smelting production of magnesium metal is cooled, dust will precipitate which in addition to sublimated magnesium chloride and other metal compounds also contains chloriated hydrocarbons. Although the chlorinated hydrocarbons are only minor components of the solids precipitated from the gas, the compounds, because of their toxicity, must be disposed of in a way that does not pollute the environment.

Dust formed in the gas leaving the electrolytic cells is collected from ducts and bag filters and dispersed in water to obtain a slurry that can be pumped.

The dust contains primarily fully chlorinated aromatic hydrocarbons: hexachlorobenzene (HCB), octachlorostyrene (OCS), pentachlorobenzonitrile (PCBN). The composition of the collected dust may be: $MgCl_2$, $MgO$, $MgOHCl$, $FeCl_3$, HCB, OCS, PCPy, DCBF, PCBN and fragments of ceramic brick linings.

Normally the content of chlorinated hydrocarbons will amount to approximately one part per thousand of the collected dust and thus be only a minor constituent of the suspended solids in the slurry.

As mentioned above, the chlorinated hydrocarbons must be destructed to avoid environmental pollution, normally through combustion at elevated temperatures. Since the accumulated slurry contains some 70% water, the balance being mainly noncombustible salts and solids, such high temperature combustion, usually performed at sea, is a rather expensive and unsatisfactory solution to the problem.

As the chlorinated hydrocarbons are almost insoluble in water, they probably appear as solid crystals (sublimates) embedded in the inorganic compounds forming the major part of insolubles of the aqueous slurry. This, of course, makes it even more difficult to develop a process for collecting and enriching the chlorinated hydrocarbons for subsequent easy and inexpensive destruction.

From U.S. Pat. No. 3,931,001 and Japan Kokai No. 74,131953 are known methods for the removal of chlorinated hydrocarbons from waste water by liquid/liquid extraction utilizing conventional extraction equipment with a counter current packed column. It is a main object of the present invention to provide an extraction method which may be utilized to remove compounds almost insoluble in water, especially chlorinated hydrocarbons, from solid particles in aqueous suspensions, where these compounds constitute less than 10% by weight of the total solid content of the suspension.

Normally one would expect a liquid/liquid extraction process to be unsuitable because of the tendency of solid particles to form sludge at the phase boundary between the liquids, and thereby to retard phase separation. Further, to obtain reasonable concentrations of chlorinated hydrocarbons in the organic solvent (1-10%), the volumetric feed ratio of organic to aqueous flow to the extractor should be very low (1:100-1:1000). Also, as the solubilities in water are very low, the leaching of the chlorinated hydrocarbons will be a slow process.

According to the present invention, however, these problems can be kept under control in a process of simultaneously leaching and extracting when using one or more consecutive mixers followed by a settler for phase separation. The aqueous suspension is brought in contact with an organic solvent, the suspension is extracted with the organic solvent in one or more mixing stages with subsequent phase separation, and each stage comprises one or more mixing sequences in series arranged upstream of a phase separation where the two liquid phases are separated and from where a substantial part of the organic solvent is recirculated to the first mixing sequence within that stage.

To avoid the problems caused by unfavorable phase ratios and phase boundary sludge formation, a major part of the organic flow containing the overflow sludge is recirculated to the mixer. Furthermore, the suspension is acidified prior to extraction, thereby dissolving metal hydroxides and other hydrolysis products which otherwise would accumulate at the phase boundary. Surprisingly it has been found that in this way it is possible to produce a concentrate free from solids that without further problems can be disposed of through simple combustion.

Further objects of and important features of the process and corresponding apparatus will be apparent from the enclosed claims. Nevertheless, the invention will also be further elucidated in reference to the examples given below and the simplified flow sheet in FIG. 1.

An aqueous suspension of electrosmelting dust is fed through a pipeline 1 to the mixing tank 20 equipped with a stirrer 21. Hydrochloric acid is added through line 2 in an amount sufficient to lower the pH to 3, preferably to 1, measured in the tank. The acidified mixture is then fed through line 7 to the first extraction stage, comprising mixers arranged in series, here three: 22, 23 and 24, equipped with stirrers, 25, 26 and 27. The organic solvent fed to the first mixer 22, will mainly be recirculated solvent from the clarifying tank 30 of the same first extraction stage, mixed with the organic overflow from the clarifying tank 36 of the next stage. Aqueous and solvent flows thus are countercurrent between extraction stages. By using three mixers in series the suspended particles will get a more uniform residence time in the mixers. This is of great importance for the leaching yield for the solid chlorinated hydrocarbons. From the last mixer of this stage, the mixture enters the settler 28, equipped with a small stirrer 29 near the organic overflow. The purpose of this stirrer is to break up the sludge and thereby avoid blocking the overflow. The organic solvent overflow containing approximately 2% of chlorinated hydrocarbons, is then led to the clarifying tank 30. The main part of the solvent, containing all the sludge contained in the overflow from the settler 28, is withdrawn from the bottom of the tank, and after mixing with overflow solvent from the clarifying tank 36 of the following stage, is recirculated to the first mixer 22. The overflow from clarifying tank 30 is led to a product storage tank 31 for subsequent combustion.

The underflow of settler 28 will be the aqueous suspension, now containing substantially less chlorinated compounds. The suspension flows via pipeline 11 into the second extraction stage with mixer 32 and agitator 33, and is mixed with solvent from the clarifying tank 36 of that stage. In mixer 32 entrained solvent in the suspension also will be exchanged, so that, when the suspension leaves the bottom of the subsequent settler 34, substantially all chlorinated hydrocarbons wil be removed. As in the first extraction stage, the second stage may of course also contain more than one mixer 32.

The organic solvent overflows from settler 34 into the clarifying tank 36 into which also fresh solvent is fed by a metering pump 38 from a storage tank 37. The overflow from clarifying tank 36 is led to the first mixer 22 of the first extraction stage, while the sludge-containing solvent underflow is recirculated to mixer 32 of the second stage.

The treated suspension underflow leaves settler 34 through pipeline 8 and can normally be disposed of without further treatment.

The equipment for conducting the process thus comprises two countercurrent stages. The process can, however, also be conducted in a one-stage apparatus comprising two or more mixers with agitators in series and one subsequent settler, where the organic and aqueous phases are separated. By internal recirculation of the organic phase from the settler to the first mixer of the stage, the flow ratio of the two phases through each stage can be kept at an value optimal for extraction efficiency and phase separation, independent of the flow ratio between the stages.

During phase separation in the settlers, a voluminous layer of sludge is quickly built up in the organic layer. By means of mild agitation by the agitators 29, 35 in the upper part of the settlers, however, the overflow of organic phase into the clarifyers 30, 36 proceeds smoothly. As sludge and organic solvents are recirculated via the pipelines 10, 5, the amount of sludge in the settlers 28, 34 appears to stabilize within reasonable time at a stationary value.

To obtain a stable operation of the settler, fluctuations in the density, i.e. in the solids content, of the aqueous underflow must be avoided. To secure this, the bottom of the settler is given a slope towards the underflow outlet as indicated in FIG. 1, the inclination exceeding the angle of repose of settling solids.

The organic solvent will preferably be an aromatic petroleum fraction (kerosene) having a flashpoint above 25° C., preferably above 60° C.

The ratio of organic and aqueous phases in the mixing sequences is greater than 1:2, preferably greater than 1:1, rendering the organic solvent the continuous phase, thereby improving phase separation after each mixing stage, i.e. within each extraction stage.

EXAMPLES

Extraction runs were performed in a continuous laboratory scale extraction unit having one stage consisting of either one or three mixers in series, followed by one settler and a clarifier.

EXAMPLE 1: (One Mixer, one Settler)

Suspensions containing either 10% or 20% solid dust from electrolytic magnesium smelting dispersed in water were used. The suspension was acidified by hydrochloric acid to pH values from 0 to 2.5. The solvent used was a kerosene fraction rich in aromatic compounds and a flash point of 66° C. The solubilities of HCB and OCS at 22° C. were found to be 8.5% and 10% (by weight), respectively.

The equipment was in continuous operation for several days under complete recirculation of the solvent from the clarifier to the mixer, thereby accumulating the chlorinated hydrocarbons in the solvent. The mixer contained 2 liters of liquid. The settling area of the settler was 33 $cm^2$ and the volume 1 liter. As it was found to have but minor importance for the extraction yield, the agitator speed was later kept at a constant value sufficient to secure a satisfactory dispersion of the phases. The feed ratio of solvent and suspension to the mixer was varied between 0.8:1 and 2:1, while the total feed rate was kept constant at 2 l/h corresponding to a mean residence time of 1 hour in the mixer. The test temperature was the same as the ambient, 20°-22° C.

Care was taken to maintain the phase boundary level halfway down the settler. During operation sludge built up quickly in the solvent phase. The sludge build-up in the organic phase as well as organic entrainment in the aqueous slurry proved to be highly dependent on the solids content in the suspension, as well as on its pH and on the feed ratio to the mixer of organic to aqueous phase. Later tests therefore were performed with a slurry made up of 10% solids in water, a pH=0.5 and a volumetric feed ratio of solvent to suspension of 1.5:1.

Even under these condition there was a considerable sludge build-up in the solvent phase, but it appeared that by recirculating the solvent, the amount of sludge approached a stationary state condition without further build-up. By applying a mild agitation in the solvent phase, the voluminous sludge collapsed and was easily separated in the adjacent clarifier to a clear organic product and a recirculation solvent contaminated with small amounts of aqueous sludge.

Under these conditions the organic entrainment in the aqueous slurry phase leaving the settler was measured to 0.05-0.01%.

Analytical tests of aqueous suspension entering and leaving the extraction stage gave an extraction yield of approximately 75% for OCS and 90% for HCB and other chlorinated hydrocarbons. As the chlorinated hydrocarbons accumulated in the circulating solvent, the measured efficiency decreased, corresponding to the content of dissolved chlorinated hydrocarbons in the solvent entrainment. Thus a 200-fold enrichment from suspension to solvent and an organic entrainment of 0.03% will reduce the overall yield by 6%.

EXAMPLE 2: (Three Mixers in Series)

This extraction run was performed under similar condition as given in Example 1, using the same settler. The single mixer of Example 1, however, was replaced by three mixers in series, each having a liquid volume of 0.67 liter. The total mean residence time in the mixers of 1 hour in Example 1 was thus still maintained. Analytical tests of the aqueous suspension now indicated that the extraction yields for OCS and HCB had increased to 87.5 and 99% respectively. Organic entrainment in the suspension appeared to be unchanged from Example 1. Thus the accumulation of chlorinated hydrocarbons in the solvent caused similar reduction in overall yields.

The examples show that the described procedure makes it possible to remove the chlorinated hydrocarbons from an aqueous suspension of solid particles and to enrich these to a level suitable for recovery or destruction, and that the sludge formation can be controlled to make a satisfactory phase separation possible. The examples show further that the extraction yield can be considerably improved by applying two or more mixers in series upstream of the settler where the phase separation takes place. Finally, the examples show that entrainment of solvent in the treated suspension will reduce the overall yield, and therefore if a high enrichment and a high degree of removal is wanted, it will be necessary to use two or more countercurrent stages.

The examples describe only extraction of chlorinated hydrocarbons from an aqueous suspension of dust from an electrolytic smelter. The procedure according to the invention can, however, also be applied for other compounds of low water solubility contained in aqueous suspensions of larger amounts of other insolubles.

As the compounds are practically insoluble in water, it is reasonable to expect that they exist as solid crystals embedded in the larger amounts of other solid inorganic compounds. One should therefore expect that the extraction rate is limited by two consecutive mechanisms: Firstly, a leaching process controlled by a mass transfer at the solid/water interface, and secondly a mass transfer from aqueous to organic phase through the liquid/liquid interphase. One would assume both these processes to be nearly proportional to the water solubility of the compounds. Thus, the procedure according to the invention gives a positive and surprising effect of securing an almost complete leaching of almost water-insoluble compounds present in amounts even less than 10% of other solid particles in an aqueous suspension.

We claim:

1. A process for enriching and extracting compounds of low water solubility from an aqueous suspension consisting essentially of substantially inorganic solid substances containing less than 10% by weight of said compounds of low water solubility, which comprises acidifying said aqueous suspension, contacting said acidified suspension with an organic solvent, extracting said acidified suspension with said organic solvent in at least two mixing stages with subsequent phase separation after each mixing stage, at least the first of said mixing stages comprising at least two mixing sequences arranged in series upstream of a phase separation where two liquid phases are separated from each other, a major proportion of said organic solvent resulting from said phase separation being recirculated to the first mixing sequence in the corresponding upstream mixing stage.

2. A process according to claim 1, wherein the aqueous suspension is extracted with the organic solvent in two or more continuous countercurrent stages.

3. A process according to claim 1 or 2, wherein the aqueous suspension is acidified to pH 3, whereafter the suspension is treated by continuous mixing and settling with a substantially recirculating organic solvent.

4. A process according to claim 3, wherein the aqueous suspension contains up to 20% solid matter.

5. A process according to claim 4, wherein the organic solvent is an aromatic petroleum fraction with a flashpoint above 25° C.

6. A process according to claim 5 wherein the flashpoint is above 60° C.

7. A process according to claim 3, wherein the aqueous suspension is acidified to pH 1.

8. A process according to claim 2, wherein the ratio of organic to aqueous phase in the mixing sequences is greater than 1:2, rendering the organic solvent the continuous phase, thereby improving phase separation after each mixing stage.

9. A process according to claim 8, wherein the ratio of organic to aqueous phase is greater than 1:1.

10. A process according to claim 1, wherein the compounds of low water solubility are chlorinated hydrocarbons.

* * * * *